(12) United States Patent
Cagliani et al.

(10) Patent No.: US 8,148,640 B2
(45) Date of Patent: Apr. 3, 2012

(54) INSULATING ELEMENT FOR BUSBARS AND INSULATING AND SUPPORTING DEVICE FOR BUSBARS COMPROMISING THIS ELEMENT

(75) Inventors: Cristian Cagliani, Molteno (IT); Daniele Cagliani, Molteno (IT)

(73) Assignee: ABB S.p.A., Milan (IT)

( * ) Notice: Subject to any disclaimer, the term of this patent is extended or adjusted under 35 U.S.C. 154(b) by 642 days.

(21) Appl. No.: 12/307,146

(22) PCT Filed: Jun. 27, 2007

(86) PCT No.: PCT/EP2007/056444
§ 371 (c)(1), (2), (4) Date: Dec. 31, 2008

(87) PCT Pub. No.: WO2008/003630
PCT Pub. Date: Jan. 10, 2008

(65) Prior Publication Data
US 2009/0173519 A1 Jul. 9, 2009

(30) Foreign Application Priority Data

Jul. 6, 2006 (IT) .............................. BG2006A0035

(51) Int. Cl.
*H01B 17/00* (2006.01)
*H02G 5/00* (2006.01)
(52) U.S. Cl. ............. 174/137 R; 174/149 B; 174/72 B; 174/68.2; 361/637; 361/611; 361/648
(58) Field of Classification Search .............. 174/137 R, 174/72 B, 71 B, 88 B, 70 B, 99 B, 129 B, 174/133 B, 149 B, 68.2; 439/212, 213, 114; 361/675, 611, 648, 637
See application file for complete search history.

(56) References Cited

U.S. PATENT DOCUMENTS

| | | | | |
|---|---|---|---|---|
| 4,002,388 A | * | 1/1977 | Menocal | 174/72 B |
| 4,025,826 A | * | 5/1977 | Wilson et al. | 174/133 B |
| 4,030,794 A | * | 6/1977 | Rozenboom et al. | 174/133 B |
| 7,335,041 B2 | * | 2/2008 | Haubach | 174/70 B |
| 7,497,711 B2 | * | 3/2009 | Gherardini et al. | 174/72 B |

FOREIGN PATENT DOCUMENTS

DE 19511358 A1 * 10/1996

* cited by examiner

*Primary Examiner* — Angel R Estrada
(74) *Attorney, Agent, or Firm* — Michael M. Rickin; Melissa J. Szczepanik

(57) ABSTRACT

The present invention relates to an insulating element (1) for producing an insulating and supporting device for busbars to install in cabinets for low voltage distribution switchboards. The invention also relates to an insulating and supporting device for busbars comprising the insulating element which essentially comprises a body made of insulating material (5) which extends along a longitudinal axis (100) between two end surfaces (8) transverse to this axis. The body made of insulating material (5) comprises a plurality of lateral surfaces (10, 20) which extend between the end surfaces (8) in the direction of said longitudinal axis (100). At least a first (10) and a second (20) of these lateral surfaces are provided with longitudinal grooves (11, 21) defined between connecting portions (15). In particular, the longitudinal grooves (11) defined on the first lateral surface (10) have a longitudinal extension (L1) differing from that (L2) of the grooves (21) defined on the second lateral surface (20).

20 Claims, 13 Drawing Sheets

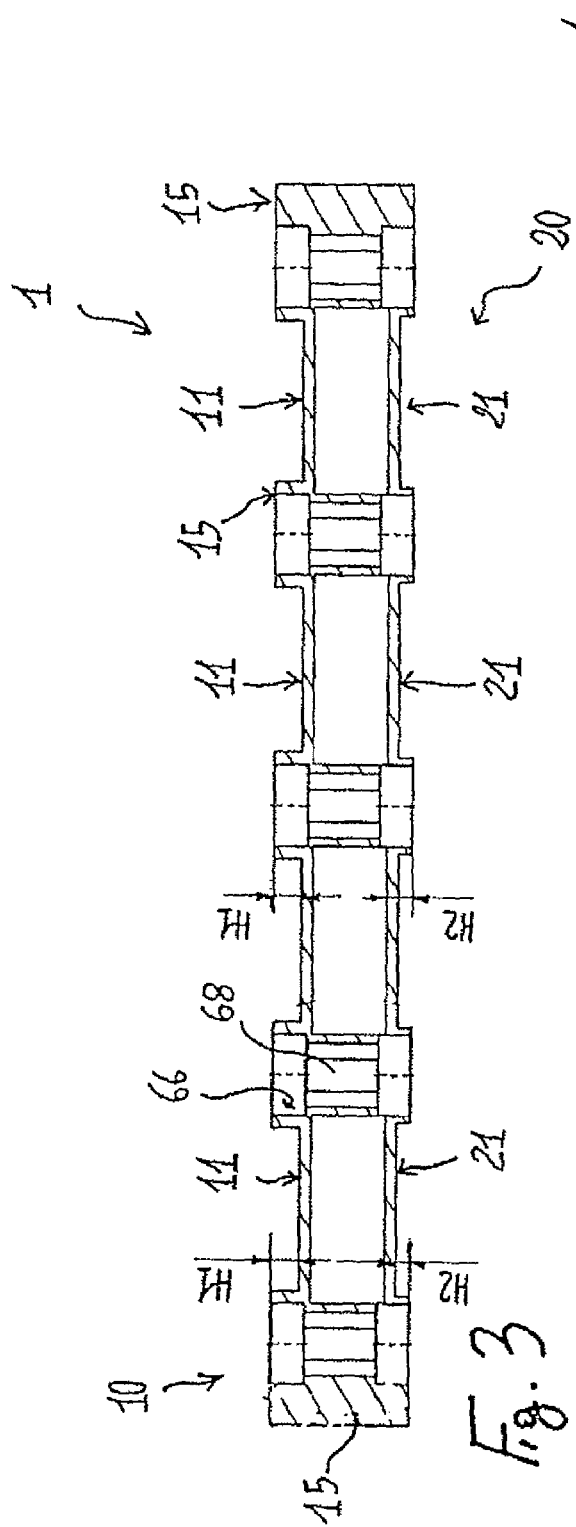
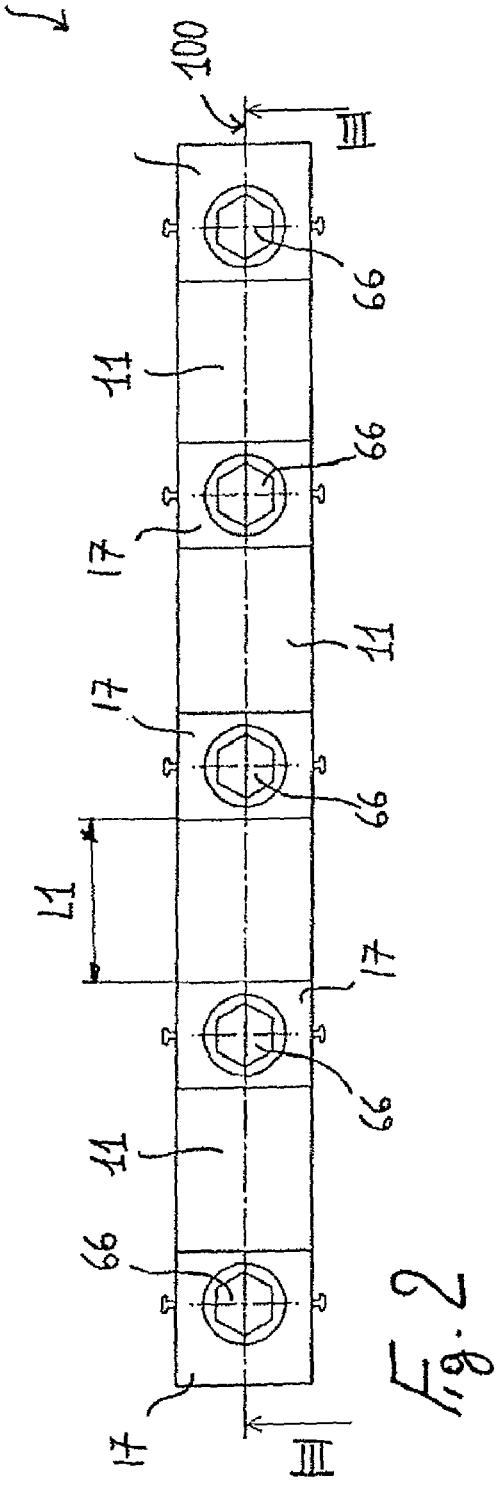
Fig. 3
Fig. 2

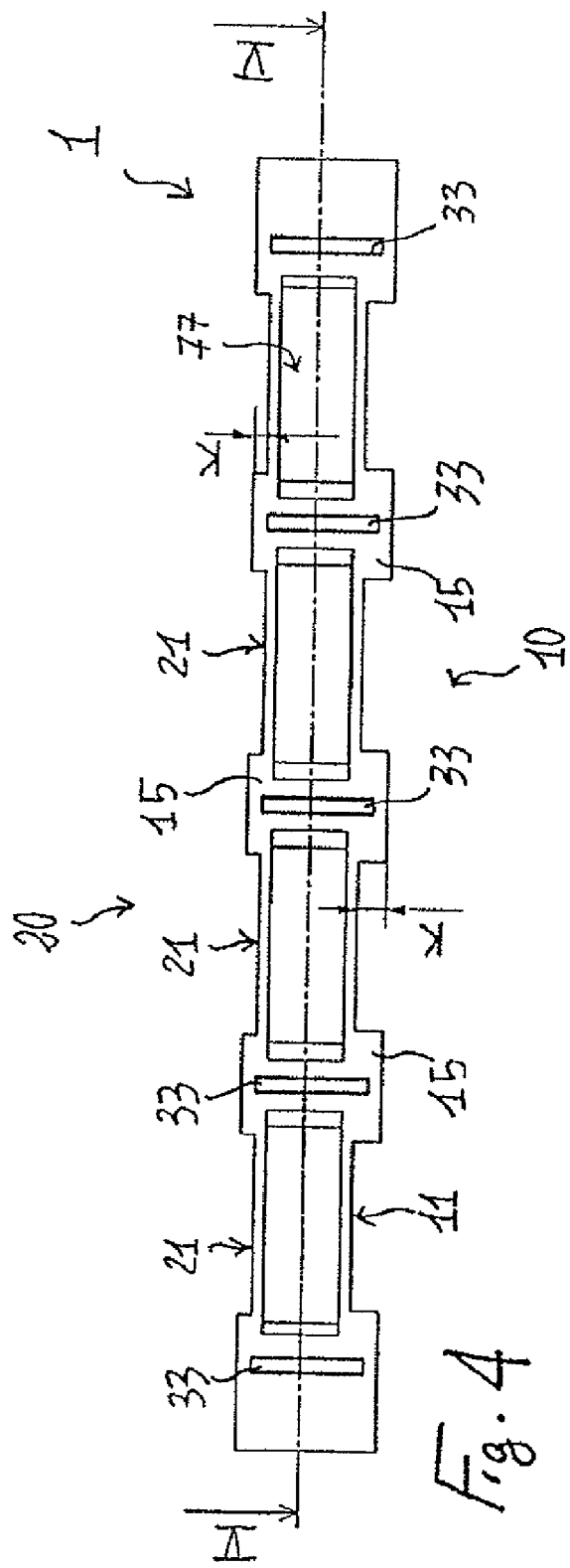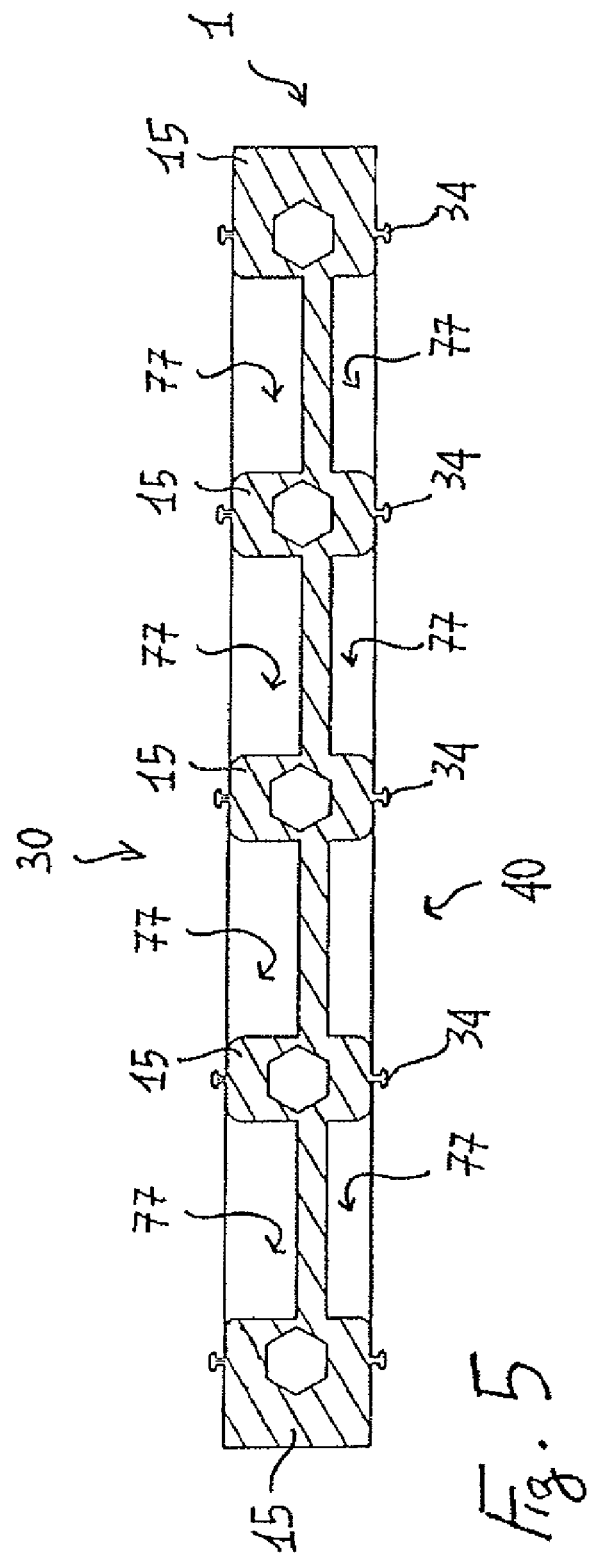

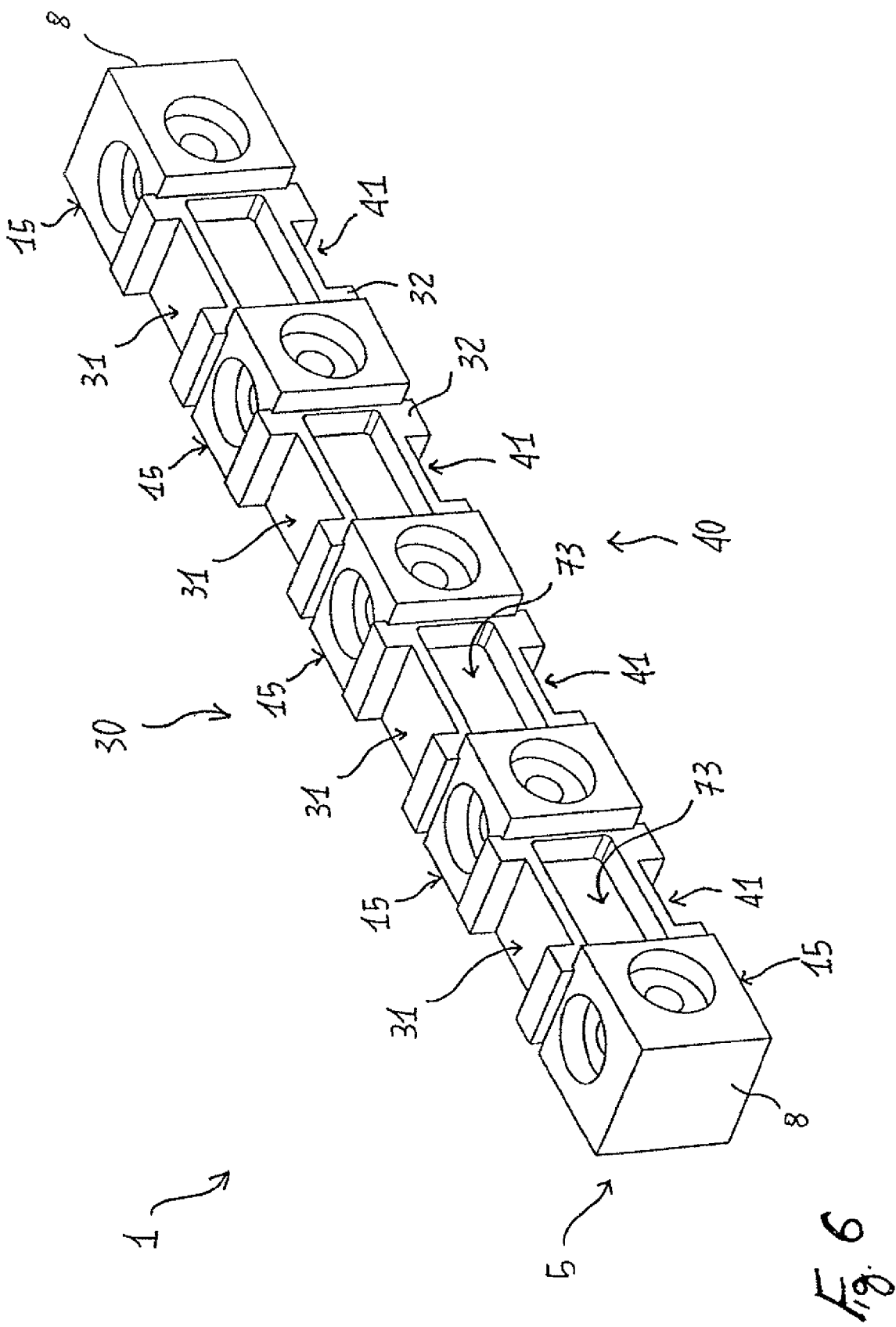

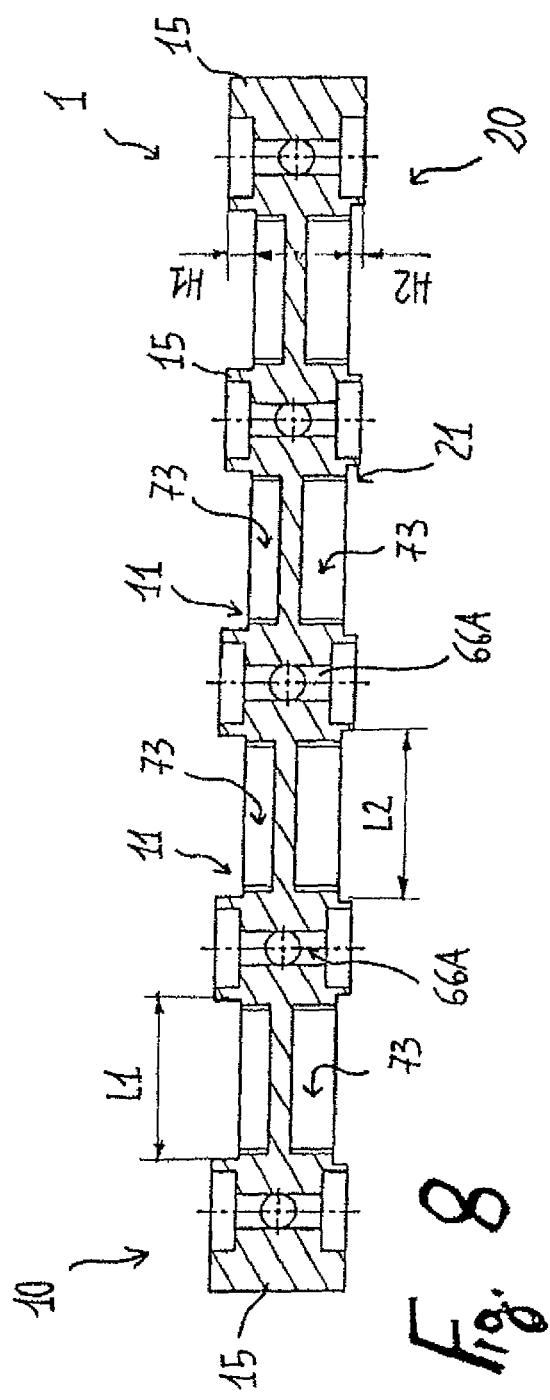
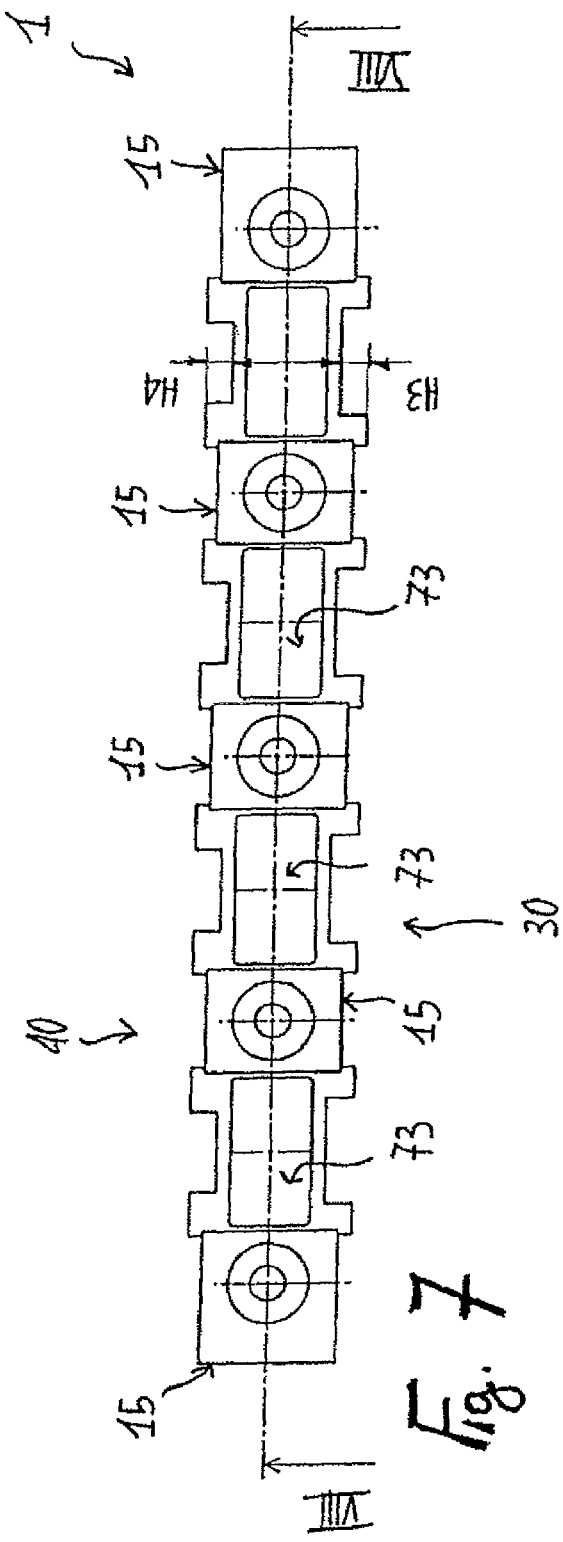

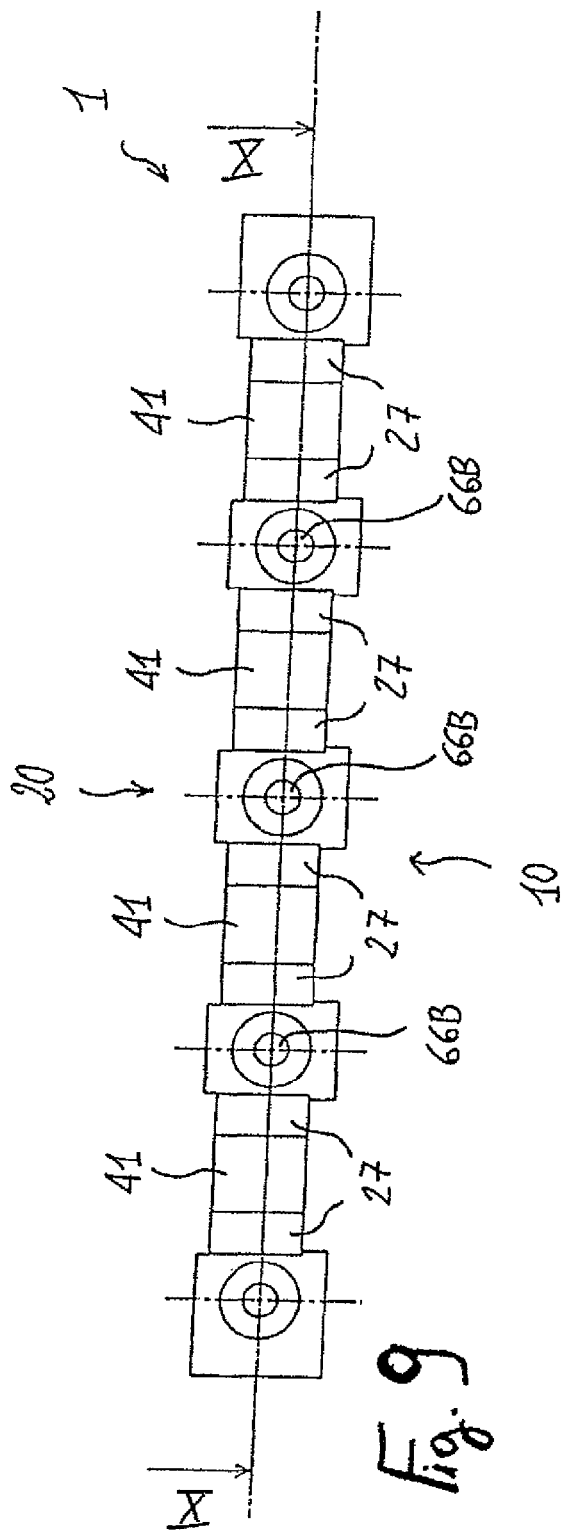
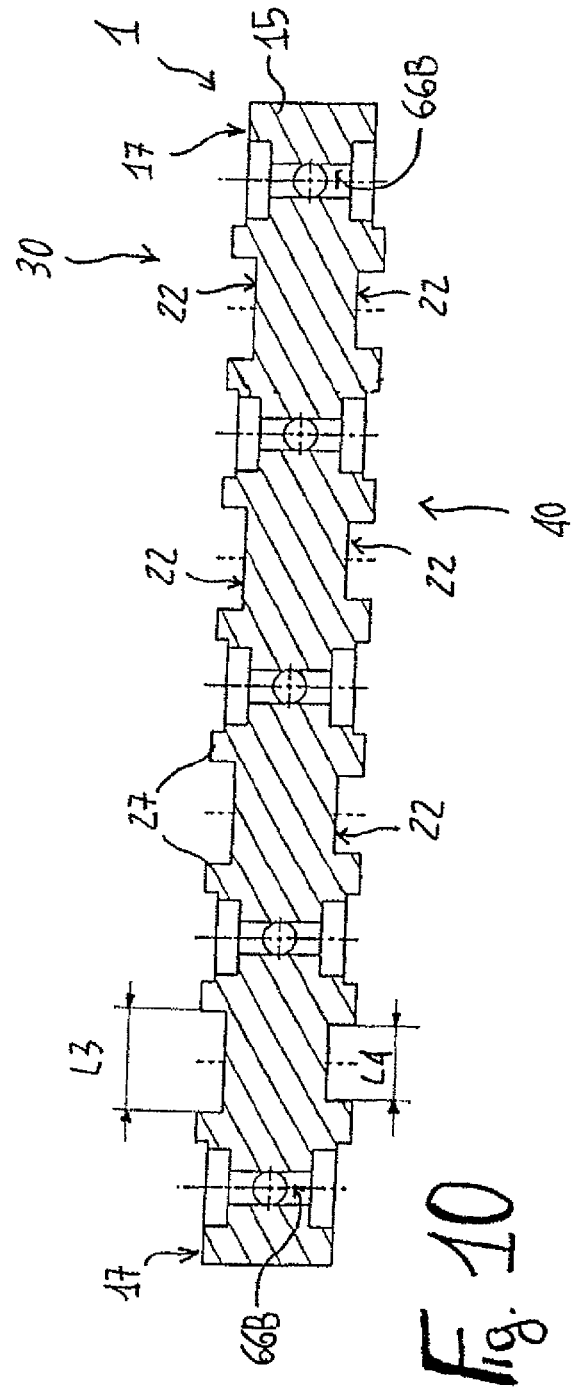

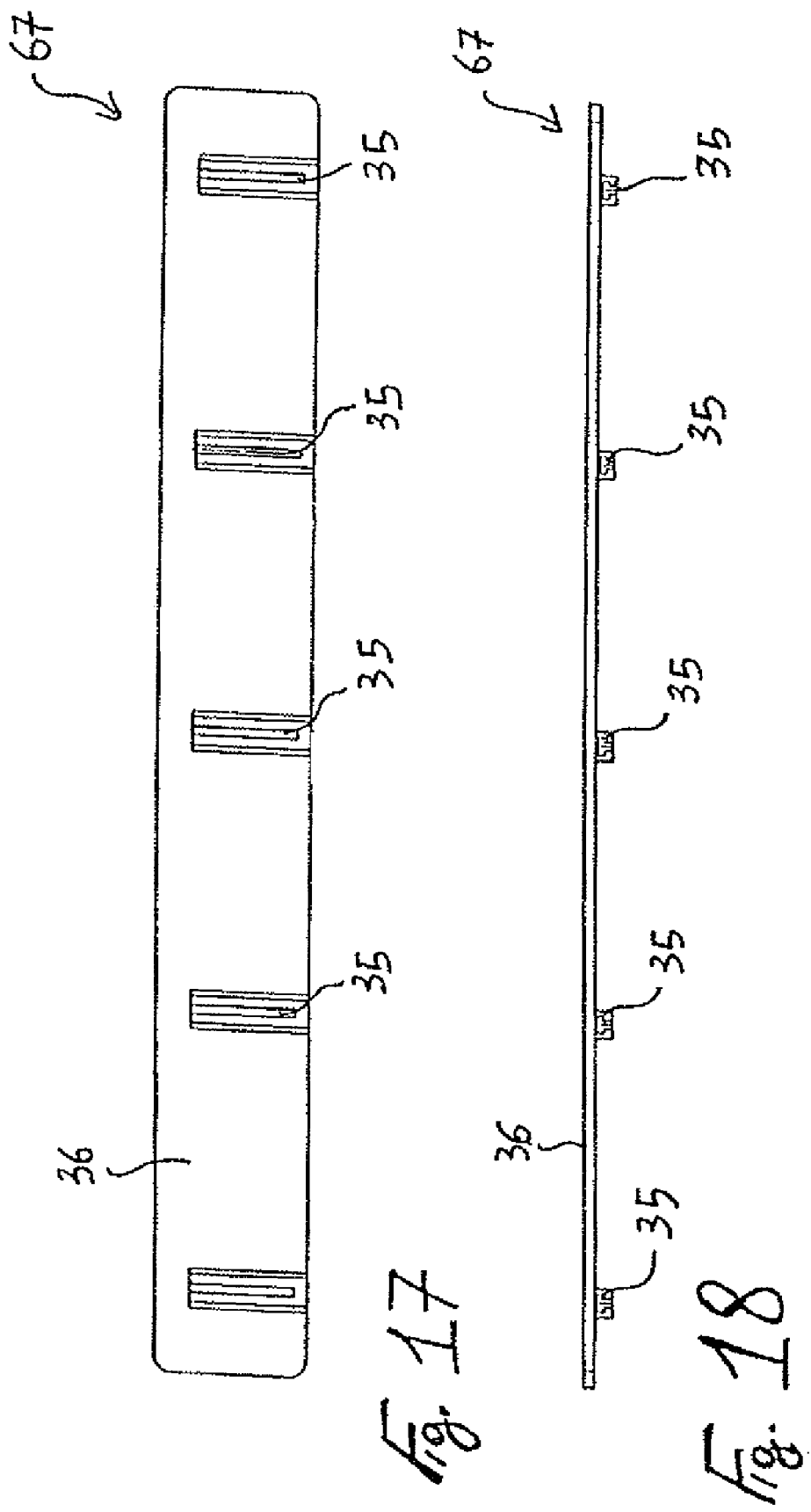

INSULATING ELEMENT FOR BUSBARS AND INSULATING AND SUPPORTING DEVICE FOR BUSBARS COMPROMISING THIS ELEMENT

The present invention relates to an insulating element to produce an insulating and supporting device for busbars installed in cabinets for low voltage distribution switchboards. The invention also relates to an insulating and supporting device for busbars comprising said insulating element.

It is know how in low voltage distribution switchboards to distribute electrical power to several pieces of electrical equipment, such as switches, there is used a system of electrical busbars disposed so that they are parallel to one another. These bars are each connected to a corresponding polarity of the electricity supply network; connection between busbars and equipment is provided by means of specific conductors, such as strips, suitably shaped according to the type of equipment. Busbars have a cross section chosen as a function of the amount of current that must flow through them. In other words, busbars have different dimensions depending on different operating conditions.

Inside switchboard cabinets, the bars are coupled geometrically with suitable insulating and supporting devices; besides electrically insulating the bars from one another, these devices allow them to be connected to a supporting structure, typically the frame of the cabinet. In this way any electrodynamic stresses produced by the current flow in the bars are discharged to the most resistant structure of the cabinet.

At the current state of the art, the majority of insulating and supporting devices have proved to have limited functional versatility, being in fact used in only one specific operating condition. In other words, they are produced to support and insulate busbars of a predetermined "cross-section" and cannot be used for bars with different cross-sections. This drawback is mainly linked to the structural configuration of the single insulating elements which, once assembled, constitute the insulating and supporting device. Therefore, to install a specific type of busbar a specific insulating device or specific insulating elements must currently be used. Naturally, this causes various disadvantages both from the viewpoint of practicality and that of cost, especially for installation operations that are not very easy and particularly onerous.

On the basis of the facts indicated above, the principal aim of the present invention is to provide an insulating element to produce insulating and supporting devices which allows the aforesaid drawback to be overcome.

Another aim of the present invention is to provide an insulating and supporting device for busbars which is functionally versatile, i.e. can be used to insulate and support different types of busbars.

Within the scope of the first aim indicated, an object of the present invention is to provide an insulating element that has a configuration relatively simple to produce with known low cost industrial processes.

Within the scope of the second aim indicated, an object of the present invention is to provide an insulating and supporting device which is produced through a limited number of easily assembled insulating elements.

Last but not least object of the present invention is to provide an insulating element and an insulating and supporting device that are highly reliable and relatively easy to produce at competitive costs.

These aims and said and other objects which will be more apparent from the following description are achieved by means of an insulating element for busbars, characterized in that it comprises a shaped body made of insulating material which extends along a longitudinal axis between two end surfaces transverse to said axis; this shaped body comprises a plurality of lateral surfaces which extend between the end surfaces in the direction of the longitudinal axis. At least a first and a second lateral surface are provided with longitudinal grooves defined between connecting portions provided to allow connection of the insulating element to another element. In particular, the longitudinal grooves on the first lateral surface have a longitudinal extension differing from that of the grooves defined on the second lateral surface.

One of the principal advantages of the invention undoubtedly lies in the functional versatility of the element, which is capable of satisfying different operating conditions when it is used in combinations with other insulating elements to produce insulating and supporting devices.

The characteristics and advantages of the invention will be more apparent from the description of preferred, but non-exclusive, embodiments of the insulating element according to the invention, illustrated by way of a non-limiting example in the accompanying drawings, wherein:

FIG. 2 is a plan view of the insulating element in FIG. 1;

FIG. 3 is a sectional view according to the line III-III in FIG. 2;

FIG. 4 is a side view of the insulating element in FIG. 1;

FIG. 5 is a sectional view according to the line V-V in FIG. 4;

FIG. 6 is a perspective view of a second embodiment of an insulating element according to the present invention;

FIG. 7 is a plan view of the insulating element in FIG. 6;

FIG. 8 is a sectional view according to the line VIII-VIII in FIG. 7;

FIG. 9 is a side view of the insulating element in FIG. 6;

FIG. 10 is a sectional view according to the line X-X in FIG. 9;

FIG. 17 is a side view of a positioning cross member of an insulating and supporting device according to the invention;

FIG. 18 is a plan view of the positioning cross member in FIG. 14;

Figure 1:
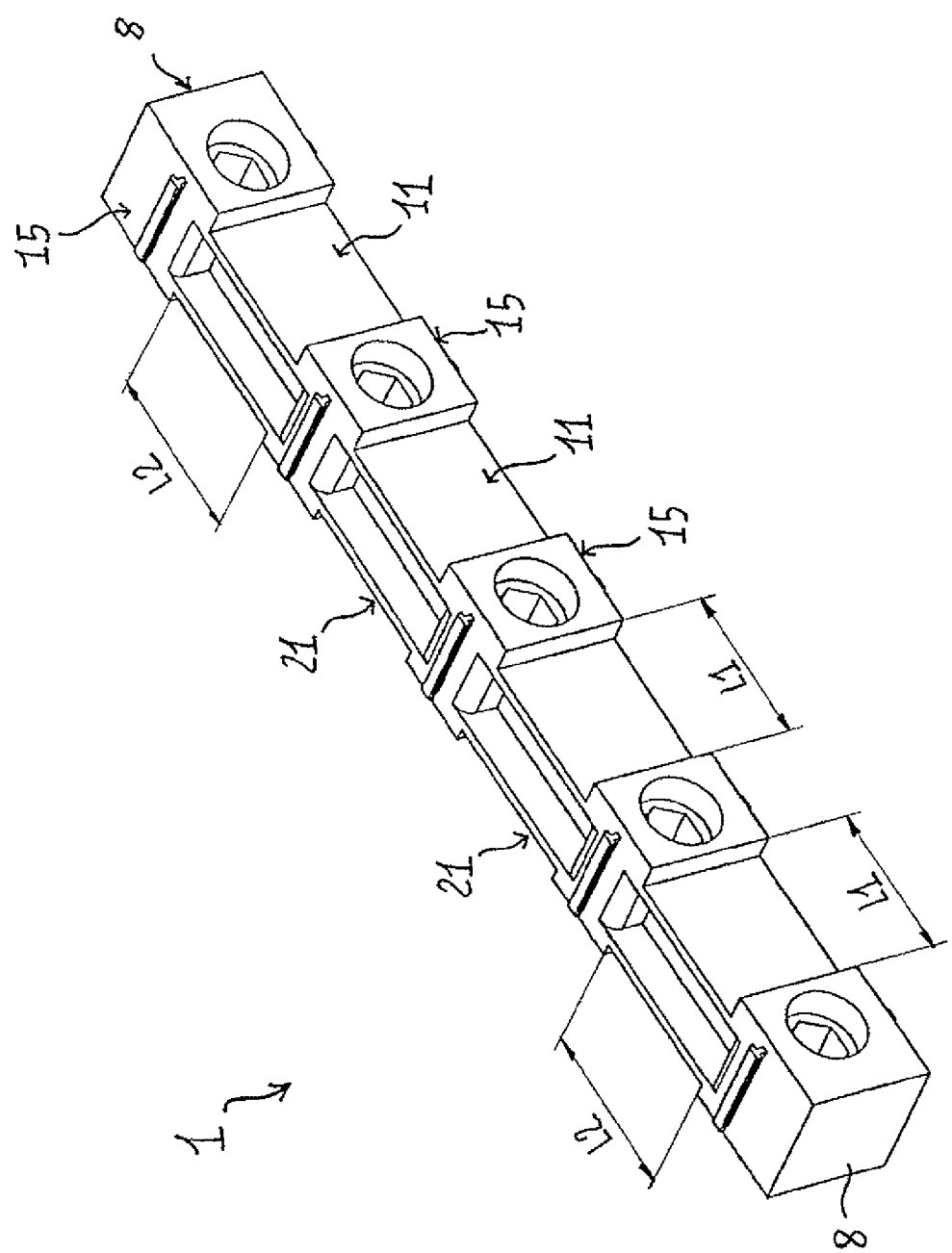
FIG. 1 is a perspective view of a first embodiment of an insulating element according to the invention.

With reference to the aforesaid figures, the insulating element 1 for busbars 200 according to the invention is characterized in that it comprises a shaped body 5, made of insulating material, which extends along a longitudinal axis 100 between two end surfaces 8 disposed transverse to said axis. The body 5 comprises a plurality of lateral surfaces 10, 20 which extend between the end surfaces 8 in the direction of the longitudinal axis 100. At least a first 10 and a second 20 of these lateral surfaces are provided with flat longitudinal grooves 11, 21 defined between connecting portions 15. It must be understood that the expression "flat groove" indicates a groove provided with at least one flat region intended to provide a support for a surface of a busbar 200.

The connecting portions 15 are designed to allow connection of the insulating element 1 to another insulating element 2 in order to provide an insulating and supporting device 3 as indicated later in the description. The connecting portions 15 also allow the insulating element 1 to be connected to a supporting surface 130 which, for example, can be a wall of the frame of a cabinet for distribution switchboards or the base of this cabinet.

FIG. 1 is relative to a first insulating element 1 according to the invention which is also characterized by the fact that the longitudinal flat grooves 11 defined on the first lateral surface 10 have a longitudinal extension L1 differing from that L2 of the grooves 21 defined on the second lateral surface 20 of the body 5. The expression "longitudinal extension" of the groove is intended as the length thereof measured according to a direction parallel to the longitudinal axis 100 of the body 5.

According to a preferred embodiment of the invention, the longitudinal grooves 11 on the first lateral surface 10 also have a height H1 differing from the height H2 of the grooves 21 defined on the second lateral surface 20 (see also FIG. 3). These heights H1, H2 must be intended as the distance measured according to a direction substantially orthogonal to the flat area of the grooves or to the longitudinal axis 100 of the body made of insulating material 5.

FIGS. 2 and 3 are respectively a plan view and a sectional side view of the insulating element 1 in FIG. 1 which has a prismatic configuration with four lateral surfaces 10, 20, 30, 40, the first 10 and the second 20 surface (provided with longitudinal flat grooves 11, 21) of which are opposite each other with respect to the longitudinal axis 100 of the body 5. As shown in the figures, the grooves 11 defined on the first lateral surface 10 all have the same longitudinal extension L1 and the same height H1. In an entirely analogous way, also the grooves 21 defined on the second lateral surface 20 all have the same dimensions L2, H2. From FIGS. 2 and 3 it is however apparent, in agreement with the indications above, that the grooves 11 defined on the first surface 10 have a longitudinal extension L1 and a height H1 differing from the respective dimensions L2 and H2 of the grooves 21 defined on the second lateral surface 20.

In FIGS. 2 and 3 the configuration of the connecting portions 15 can also be observed, which as indicated are designed to allow connection of one insulating element to another insulating element 2 to produce an insulating and supporting device 3 such as the one shown in FIGS. 11 to 16 and described below.

Figure 19:
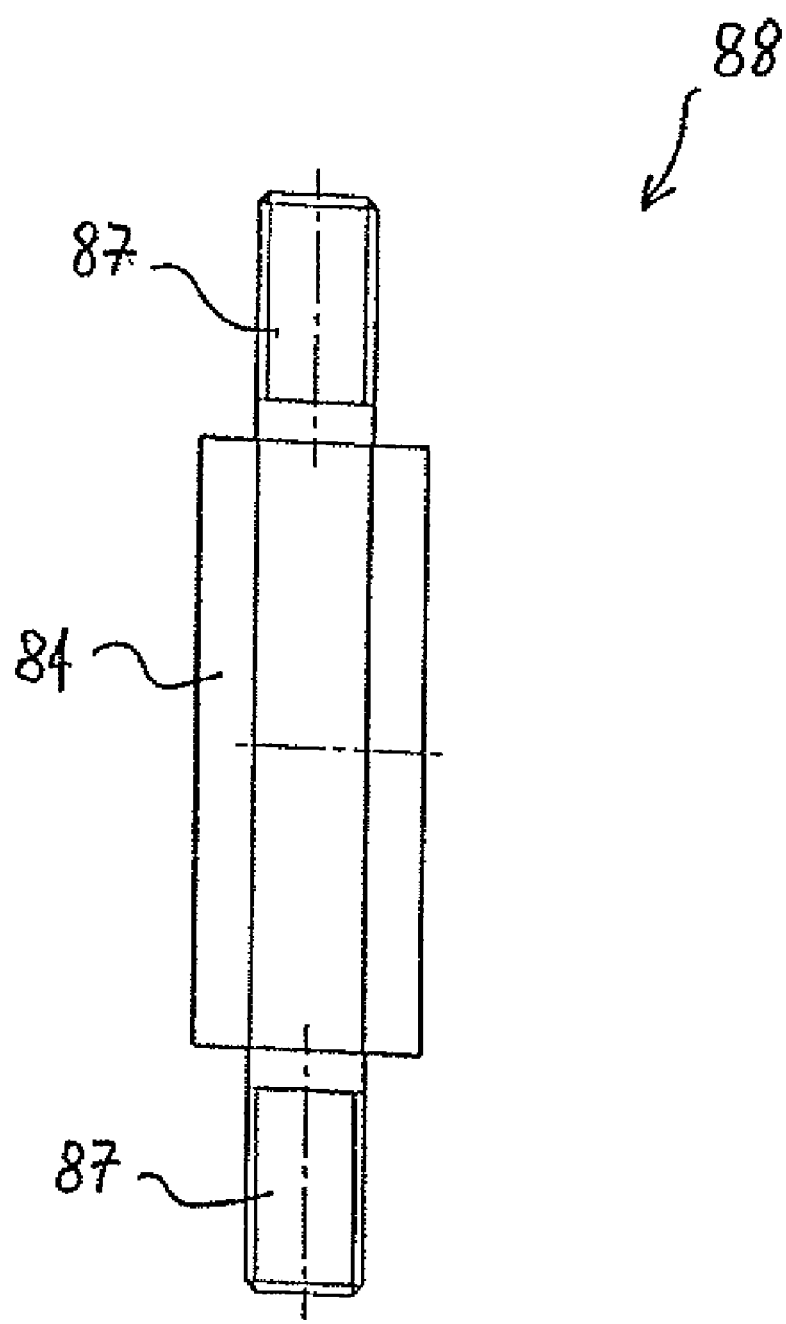
FIG. 19 is a view of connection means of an insulating and supporting device according to the present invention.

More specifically, the connecting portions 15 are constituted by flat surfaces 17 which extend on the first 10 and on the second 20 lateral surface, preferably at a same height K with respect to the longitudinal axis 100 of the body 5 (see FIG. 4). At these flat surfaces 17 there are provided seats to house connecting means 88 which can, for example, be connection screws such as those shown in FIG. 19. More specifically, in the solution shown the housing seats extend as through openings 66 from the first 10 to the second 20 surface in order to allow insertion of the connection screws 88. As shown in FIG. 19, these screws have threaded ends 87 and a central body 88 preferably with a polygonal cross section. Also the through openings 66 have a segment 68 with a polygonal cross section coincident with that of the connection screws 88. By means of this solution a shape coupling is generated between the connection screws and the relative seat which facilitates installation of the insulation element 1 at the same time increasing the efficiency and stability of the connection.

FIGS. 4 and 5 are views again relative to the insulation element 1 in FIG. 1 which allow observation of the conformation of further lateral surfaces constituting the body 5. More specifically, this body comprises a third 30 and a fourth 40 lateral surface, opposite each other with respect to the longitudinal axis 100 of the body 5 and each comprising indentations 77 defined longitudinally between the connecting portions 15. These indentations 77 have the function of lightening the structure of the body 5 with a view to advantageous saving on final production costs.

As shown, on the third lateral surface 30 there is provided a first series of fastening protrusions 33 to allow fastening of a positioning cross member 67 (see FIGS. 17 and 18) the function of which will be described below. More specifically, these protrusions 33 are located in a longitudinal position corresponding to that of the connecting portions 15 and extend orthogonally to the longitudinal axis of the body 5.

The insulating element 1 advantageously also comprises a second series of fastening protrusions 34 disposed on the fourth lateral surface 40 analogous to those of the first series 33. This solution increases the versatility of use of the insulating element 1 as it allows the positioning cross member 67 to be fastened on two different surfaces according to installation requirements.

For this purpose the positioning cross member 67 has the function of providing an advantageous reference for positioning of the busbars 200 during the installation operations. At the same time it allows the ends of these busbars 200 to be isolated from the space therebelow. FIGS. 17 and 18 show a possible embodiment of a positioning cross member 67 which is in the form of a plate 36 of insulating material having a substantially longitudinal extension. On one surface of this plate 36 fastening seats 35 are produced, each to house a protrusion 33 or 34 produced on the third 30 or on the fourth 40 lateral surface of the body 5.

FIGS. 6 to 10 relate to a second embodiment of an insulating element 1 according to the present invention which differs with respect to the previous embodiment due to the fact that it comprises a third 30 and a fourth 40 lateral surface, also provided with longitudinal flat grooves 31 and 41 defined between connecting portions 15. In other words, with respect to the solution described previously, each lateral surface 10, 20, 30, 40 of the body 5 comprises flat grooves 11, 21, 31, 41 which allow positioning of a busbar 200 thereon. Naturally, the presence of a greater number of lateral surfaces provided with grooves further increases the versatility of use of the element 1, as will be apparent hereunder.

With reference to FIGS. 7 to 10, the grooves defined on one of the lateral surfaces of the body 5 preferably have a longitudinal extension L1 differing from that of the grooves defined on any one of the other lateral surfaces of the body. For example, by comparing FIG. 8 with FIG. 10, it can be seen that the longitudinal extension L1 of the grooves 11 defined on the first lateral surface 10 is greater with respect to that L3 of the grooves 31 produced on the third lateral surface 30. The same conclusion can be reached by comparing, for example, the grooves 21 defined on the second lateral surface 20 with those 41 defined on the fourth lateral surface 40.

Again according to a preferred embodiment of the invention, the heights of the grooves are also distinguished by a dimensional ratio analogous to the one mentioned above. More specifically, the grooves defined on one of the lateral surfaces have a height, measured according to a direction substantially orthogonal to the longitudinal axis 100, differing from the height of the grooves defined on any of the other lateral surfaces of the shaped body 5 made of insulating material. By comparing FIG. 7 with FIG. 10, it can for example be seen that the grooves 21 defined on the second lateral surface 20 have a height H2 considerably lower than that of the grooves H4 defined on the fourth lateral surface 40.

The geometrical ratios between the grooves indicated above must be intended as preferred, but at the same time do not intend to limit to the inventive concept. In other words, the scope of the invention includes the possibility that, for example, the grooves defined on the first lateral surface 10 have a longitudinal extension or a height equivalent to that of the grooves defined on one of the other lateral surfaces.

FIG. 6 is a perspective view that allows in particular observation of the conformation of the various grooves produced on the lateral surfaces of the body 5. In particular, the grooves 11 and 21 provided on the first 10 and on the second 20 lateral surface, comprise a flat portion 32 from which a recess 73 extends in the direction of the second opposite lateral surface. The totality of recesses 73 thus defined (see also FIGS. 7 and 8) considerably lightens the structure of the insulating element 1, similarly to the indentations 77 indicated with reference to the previous embodiment described.

FIGS. 7 and 10 highlight in particular the conformation of the third 30 and of the fourth 40 lateral surface of the body 5. The flat grooves 31 and 41 defined on these surfaces 30 and 40 each comprise a continuous flat portion 22 defined between two shoulders 27 which emerge with respect to the level of the flat surface 15A of the connecting portions 15 adjacent to these grooves.

With reference now to FIGS. 8 and 9, in this second embodiment of the invention the connecting portions 15 each comprise housing seats which extend according to directions substantially orthogonal to each other. More specifically, they are defined by a first through opening 66A from the first 10 to the second 20 lateral surface and by a second through opening 66B from the third 30 to the fourth 40 lateral surface. This solution allows the insulating element 1 to be oriented according to different operating directions and according to service requirements.

From the indications above it is apparent that the insulating element 1 is distinguished by a relatively simple structure obtainable, for example, through known industrial moulding processes. With a view to this, the flat grooves 11, 21, 31, 41, as a result of their longitudinal extension, do not complicate the moulding operations to the advantage of a reduction in production costs.

The present invention also relates to an insulating and supporting device 3 characterized in that it comprises a first 1 and a second insulating element 2 defined according to the indications in the description above. Hereunder in the description the structural parts and geometrical references relative to the second element 2 will be indicated with the suffix A to distinguish them from the corresponding parts and from the corresponding references relative to the first element 1.

In agreement with the above, the first insulating element 1 is defined by a shaped body 5 made of insulating material which extends along a longitudinal axis 100 between two end surfaces 8 transverse to said longitudinal axis. The shaped body 5 comprises lateral surfaces which extend between the end surfaces 8 in the direction of the longitudinal axis 100. At least a first 10 and a second 20 of these surfaces are provided with flat grooves 11, 21 defined longitudinally between connecting portions 15. The grooves 11 defined on the first lateral surface 10 have a longitudinal extension L1 differing from that L2 of the longitudinal grooves 21 defined on the second lateral surface 20.

Analogously, the second element 2 is defined by a shaped body 5A made of insulating material which extends along a longitudinal axis 100A between two end surfaces 8A transverse with respect to this longitudinal axis. The second element 2 comprises a first 10A and a second lateral surface 20A provided with longitudinal flat grooves 11A, 21A defined longitudinally between connecting portions 15A. The grooves 11A defined on the first lateral surface of the second element 2 have a longitudinal extension L1A differing from that L2A of the longitudinal grooves defined on the second lateral surface 20A of the shaped body 5 (see FIG. 13).

The insulating and supporting device 3 according to the invention is also characterized in that it comprises connecting means 88 provided to connect the first element 1 to the second element 2 at the connecting portions 15, 15A of these two elements. More specifically, the two insulating elements 1 and 2 are connected so as to allow the grooves 11, 21 defined on one of the lateral surfaces 10, 20 of the first element 1 to combine with the longitudinal grooves 11A, 21A defined on one of the lateral surfaces 10A, 20A of the second element 2 to generate a series of cavities 91, 92 for insulation and support of said busbars 200. More specifically, the dimensions of the cavities 91, 92 thus generated vary according to the dimensions of the grooves that are combined with one another. This means that each series of cavities 91, 92 is defined to allow insulation and support of a specific series of busbars 200. Consequently, when the number of the lateral surfaces provided with longitudinal bars increases, this causes an increase in the versatility of the insulating and supporting device, as there is an increase in the number of types of busbars 200 that can be supported and insulated by means of the device 3.

FIGS. 11 to 14 each show a possible combination of the two insulating elements 1, 2 according to the invention, i.e. a possible operating configuration of the device 3. In particular, in the combinations shown, the first element 1 corresponds substantially to that shown in FIG. 1, while the second element 2 of the device 3 corresponds substantially to that shown in FIG. 6 and described in detail above. In other words, according to a preferred embodiment of the invention, the first element 1 comprises two lateral surfaces 10, 20 provided with longitudinal grooves 11, 21, while the second element 2 is instead provided with four lateral surfaces 10A, 20A, 30A, 40A provided with longitudinal grooves 11A, 21A, 31A, 41A. This solution translates into the possibility of installing the device 3 according to eight possible operating configurations with obvious advantages from a viewpoint of practicality.

Figure 11:
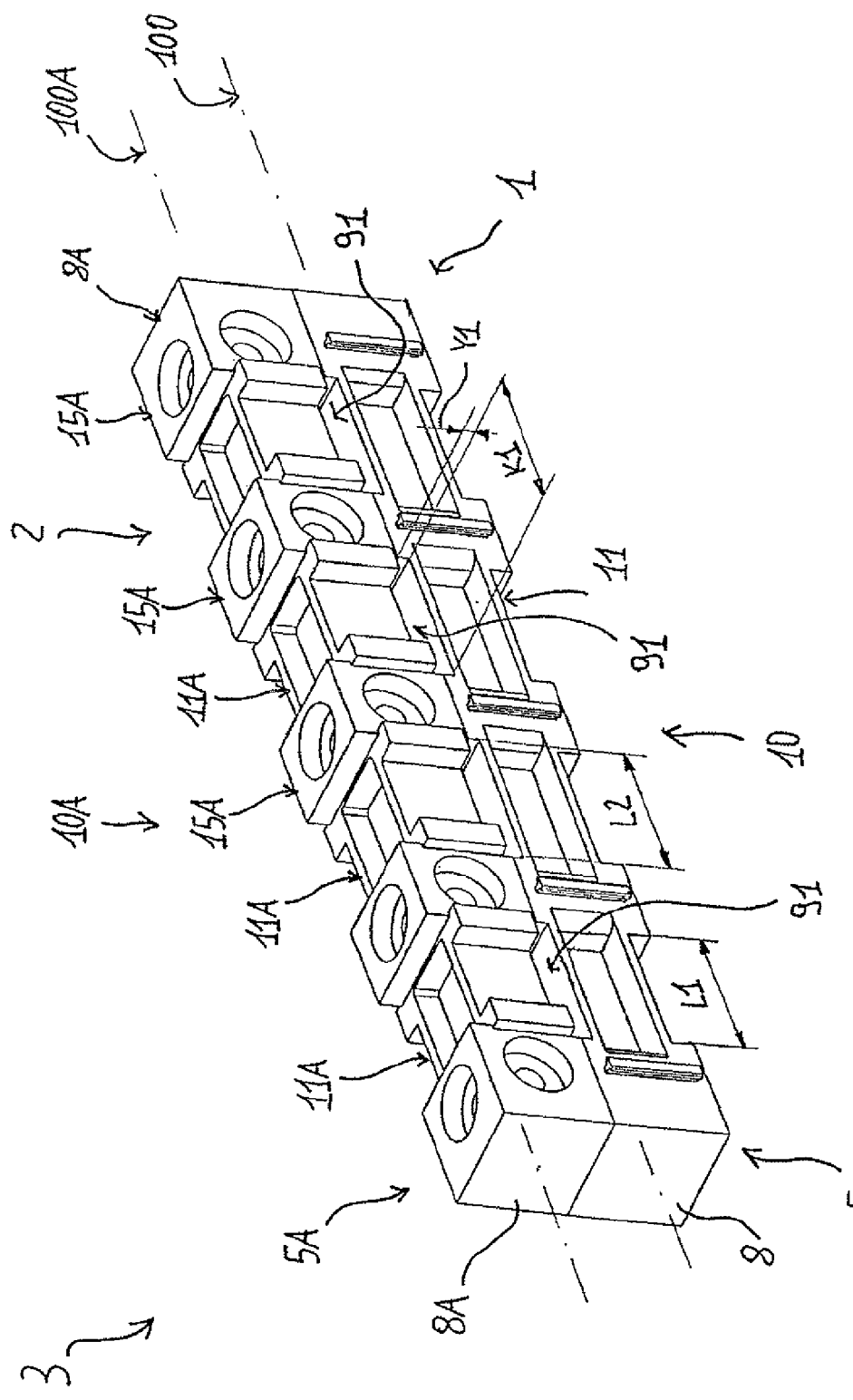
FIGS. 11 to 14 are views relative to possible combinations of insulating elements to produce an insulating and supporting device according to the invention.

With reference, for example, to FIG. 11 and according to a preferred embodiment of the invention, for both insulating elements 1 and 2, the first 10, 10A and the second 20, 20A lateral surface of said elements 1, 2 are opposite each other with respect to the relative longitudinal axis 100, 100A. Moreover, the grooves 11, 11A defined on the first lateral surface 10, 10A of one of the two elements 1, 2 have a height H1, H1A differing from the height H2, H2A of the longitudinal grooves 21, 21A defined on the second lateral surface 20, 20A of this element.

In the embodiment shown in FIGS. 11 to 14, the first element comprises a third 30 and a fourth 40 lateral surface opposite each other with respect to the longitudinal axis of this element. At least one of these lateral surfaces 30, 40 comprises a series of protrusions designed to allow fastening of a positioning cross member 67 according to the objects and methods already indicated above. Preferably, the third 30 and the fourth 40 surface of the first element 1 respectively comprise a first 33 and a second 34 series of fastening protrusions placed in a longitudinal position corresponding to that of the connecting portions 15. As shown, these portions are provided with seats to house the connecting means 88 and more specifically these seats extend as through openings from the first 10 to the second 20 lateral surface.

Again with reference to the embodiment shown in FIGS. 11 to 14, the second element 2 of the device 3 comprises a third 30A and a fourth 40A lateral surface provided with flat grooves 31, 41 also defined by the connecting portions 15A produced on the shaped body 5. The connecting means 88 connect the first element 1 to the second element 2 to allow the grooves 11, 21 defined on one of the lateral surfaces 10, 20 of the first element 1 to combine with the grooves 31A, 41A defined on the third 30A and on the fourth 40A lateral surface of the second insulating element 2 to generate a series of cavities 93, 94 for insulation and support of busbars. For this purpose the connecting portions 15A of the shaped body 5A of the second element 2 comprise seats to house the connecting means 88 which extend as first through openings from the first 10A to the second 20A lateral surface and as second through openings from the third 30A to the fourth 40A lateral surface.

In the solution shown in FIG. 11 the two insulating elements 1, 2 are coupled so that the grooves 21 defined on the second lateral surface 20 of the first element 1 combine with those 11A defined on the first lateral surface 10A of the second element 1 to generate a first series of cavities 91 having a longitudinal extension K1 and a height Y1 depending on the dimensions of these grooves.

Figure 12:
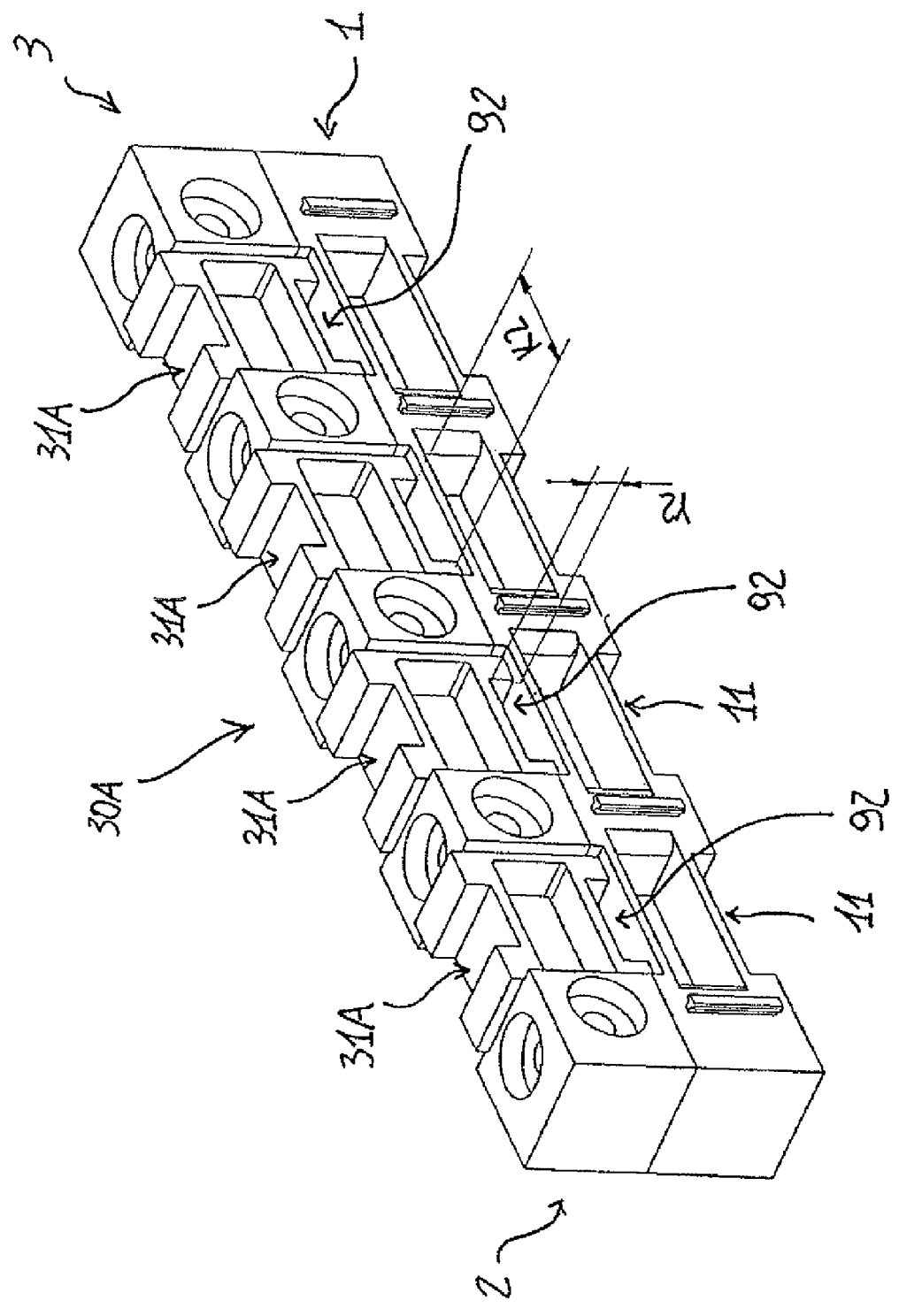

In the solution shown in FIG. 12, the grooves 21 defined on the second lateral surface 20 of the first element 1 combine with those 41 defined on the fourth lateral surface 40A of the second element 2 to generate a second series of cavities 92 (with longitudinal extension K2 and height Y2) of lesser dimensions with respect to the cavities obtained with the previous combination. It must be observed that from a viewpoint of practicality passage from the combination shown in FIG. 11 to that of Figure is obtained by rotating the second element 2 through 90° along the longitudinal axis 100A thereof.

Figure 13:
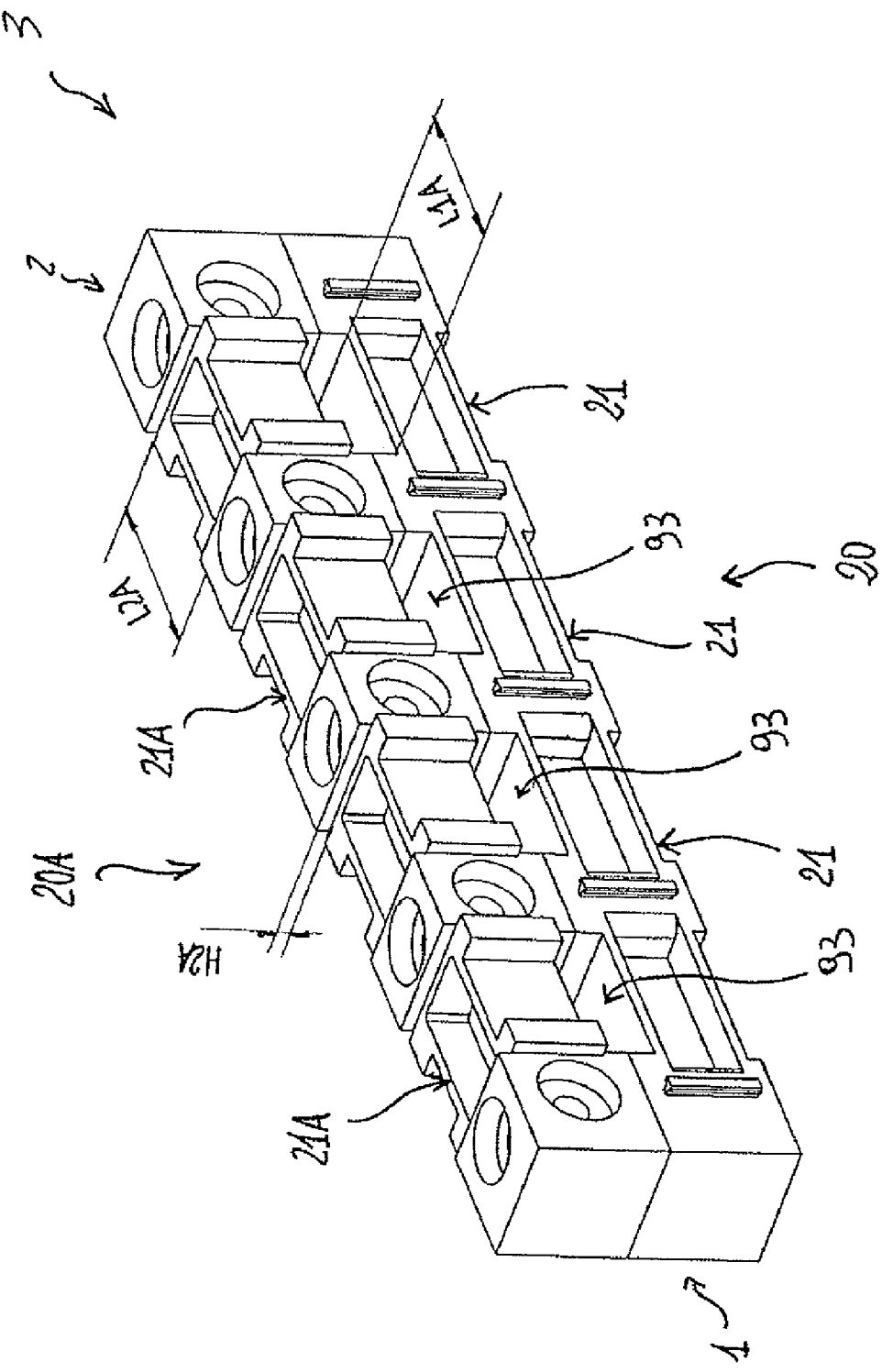
Figure 14:
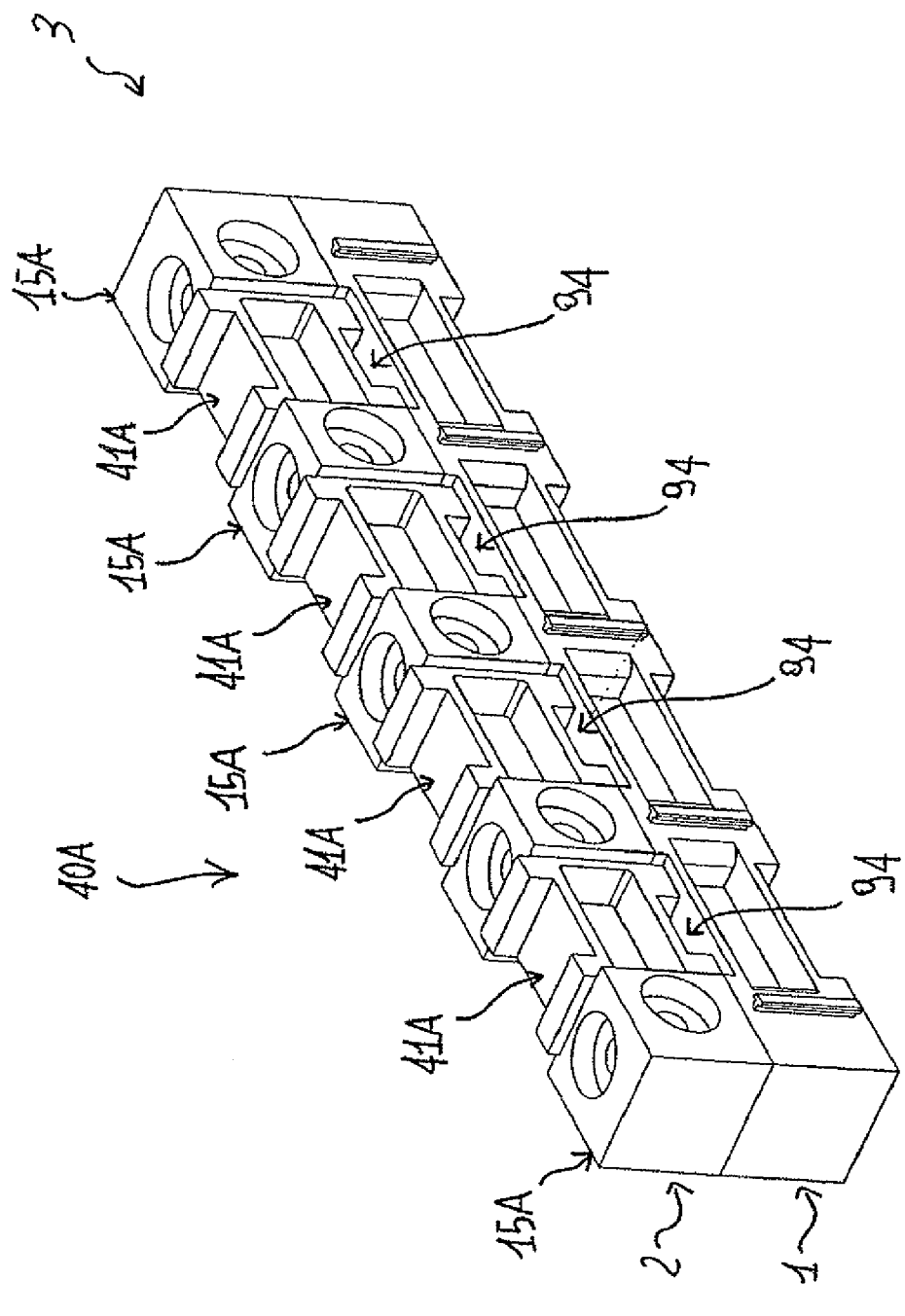

FIGS. 13 and 14 show further operating configurations of the insulating and supporting device 3, i.e. further possible couplings of the first element 1 with the second element 2. More specifically, in the solution in FIG. 13, the two elements 1, 2 are coupled so that the grooves 11 defined on the first lateral surface 10 of the first element 1 combine with those 11A defined on the first lateral surface 10A of the second element 2 to generate a third series of cavities 93. In the solution in FIG. 14 the two elements 1 and 2 are instead coupled so that the grooves 21 defined on the second lateral surface 20 of the first element 1 combine with those 31A defined on the third lateral surface 30 of the second element 2 to generate a fourth series of cavities 94 of dimensions differing from the other series of cavities.

Figure 16:
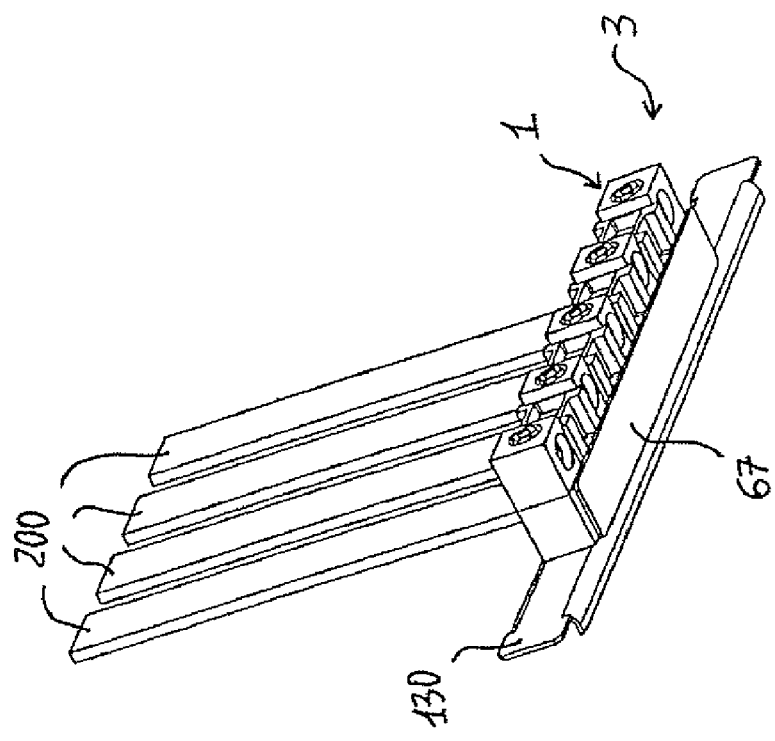
FIGS. 15 and 16 are perspective views of an insulating and supporting device of busbars according to the invention.
Figure 15:
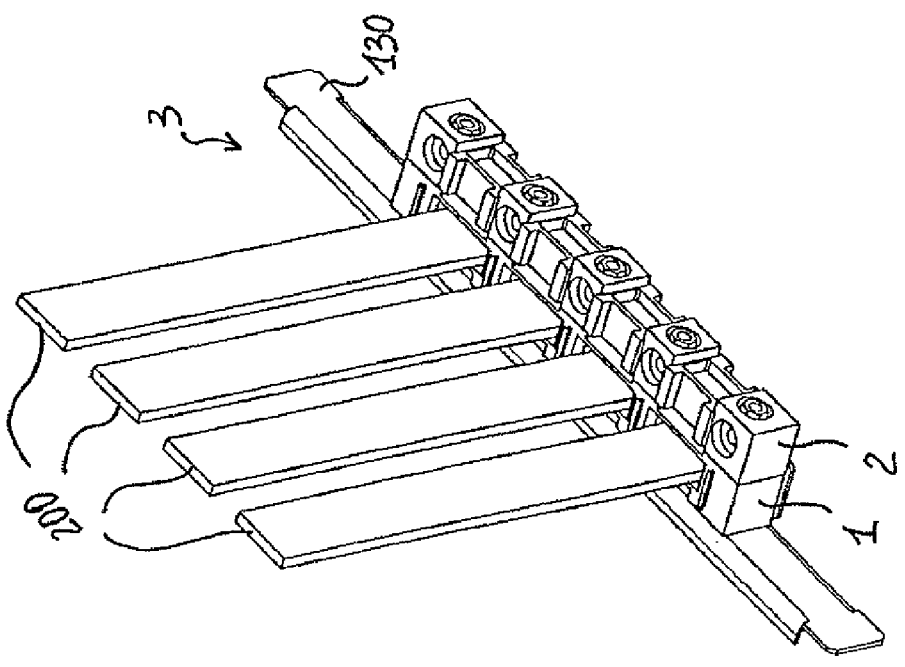

FIGS. 15 and 16 are perspective views relative to a possible installation of the insulating and supporting device 3 according to the invention. As is apparent, the connection means 88 (for example constituted by the screws shown in FIG. 19 and already described above), fasten the two insulating elements 1, 2 to a supporting surface 130 which can, for example, be a part of the frame of a cabinet of a distribution switchboard. As shown, the insulating and supporting device 3 is advantageously completed by the positioning cross member 67 (see FIGS. 17 and 18) the function of which has already been described as have the relative assembly methods. More specifically, the positioning cross member 67 is connected to a third 30 or to a fourth 40 lateral surface of the first insulating element 1 according to installation requirements.

The technical solutions adopted for the insulating element and for the insulating and supporting device allow the aforementioned aims and objects to be fully achieved. In particular, the insulating element has a structural configuration easy to produce through known low cost industrial processes. The insulating and supporting device also allows different operating requirements to be satisfied as it is capable of insulating and supporting busbars of different dimensions.

The insulating element and the insulating and supporting device thus conceived are susceptible to numerous modifications and variants, all falling within the scope of the inventive concept; moreover, all details could be constituted by other technically equivalent elements.

In practice, the materials employed and the dimensions and contingent forms can be any according to requirements and to the state of the art.

The invention claimed is:

1. An insulating element for busbars comprising a body made of insulating material which extends along a longitudinal axis between two end surfaces transverse to said longitudinal axis, said body comprising a plurality of lateral surfaces which extend between said end surfaces in the direction of said longitudinal axis, at least a first and a second of said lateral surfaces being provided with longitudinal grooves defined between connecting portions, said longitudinal grooves defined on said first lateral surface having a longitudinal extension (L1) differing from a longitudinal extension (L2) of said grooves defined on said second lateral surface.

2. The insulating element of claim 1 wherein said longitudinal grooves defined on said first lateral surface have a height (H1), measured according to a direction substantially orthogonal to said longitudinal axis, differing from a height (H2) of said grooves defined on said second lateral surface.

3. The insulating element of claim 1 wherein said grooves defined on one of said lateral surfaces all have a length and a height substantially equivalent.

4. The insulating element of claim 1 wherein said first lateral surface and said second lateral surface are opposite each other with respect to said longitudinal axis.

5. The insulating element of claim 1 wherein said connecting portions comprise seats to house connecting means for connecting said insulating element to another insulating element and/or to a supporting surface.

6. The insulating element of claim 4 wherein said housing seats extend as through openings from the first lateral surface to the second lateral surface.

7. The insulating element of claim 5 wherein said body has a prismatic configuration with four lateral surfaces provided with a third lateral surface and a fourth lateral surface opposite each other with respect to said longitudinal axis.

8. The insulating element of claim 7 wherein said insulating element comprises a first series of fastening protrusions provided along said third lateral surface to allow fastening of a positioning cross member, said fastening protrusions being placed in a longitudinal position corresponding to that of said connecting portions.

9. The insulating element of claim 8 wherein said insulating element comprises a second series of fastening protrusions provided along said second lateral surface to allow fastening of said positioning cross member.

10. The insulating element claim 7 wherein said third lateral surface and said fourth lateral surface are provided with longitudinal grooves defined between connecting portions.

11. The insulating element of claim 10 wherein said longitudinal grooves defined on one of said lateral surfaces have a longitudinal extension differing from that of said grooves defined on any one of the other lateral surfaces.

12. The insulating element of claim 11 wherein said grooves defined on one of said lateral surfaces have a height, measured according to a direction substantially orthogonal to said longitudinal axis, differing from the height of said grooves defined on any one of said other lateral surfaces.

13. The insulating element of claim 7 wherein said housing seats comprise a first through opening extending from said first lateral surface to said second lateral surface, and a second through opening extending from said third lateral surface to said fourth lateral surface.

14. An insulating and supporting device for busbars comprising:
a first element and a second element each having a body made of insulating material which extends along a longitudinal axis between two end surfaces transverse to said axis, said first element and said second element each comprising at least a first lateral surface and a second lateral surface, each provided with a series of longitudinal grooves defined between connecting portions, said grooves defined on said first lateral surface of one of said first and second elements having a longitudinal extension (L1, L1A) differing from a longitudinal extension (L2, L2A) of said longitudinal grooves defined on said second lateral surface of the same element; and
connecting means connecting said first element to said second element at said connecting portions so that said grooves defined on one of the lateral surfaces of said first element combine with one of said longitudinal grooves defined on one of the lateral surfaces of said second element and form a series of cavities for insulation and support of busbars.

15. The insulating and supporting device of claim 14 wherein said grooves defined on said first lateral surface of one of said first and second elements have a height (H1, H1A), measured according to a direction substantially orthogonal to said longitudinal axis, differing from a height (H2, H2A) of said longitudinal grooves defined on said second lateral surface of the same element.

16. The insulating and supporting device of claim 14 wherein said first lateral surface and said second lateral surface of said first and second elements are opposite each other with respect to the respective longitudinal axis.

17. The insulating and supporting device of claim 16 wherein said connecting portions of said first element and of said second element comprise seats to house said connecting means, said seats of said first element extending as through openings from said first lateral surface to said second lateral surface.

18. The insulating and supporting device of claim 14 wherein said first element comprises a third lateral surface and a fourth lateral surface opposite each other with respect to said longitudinal axis of said first element, at least one of said third and said fourth lateral surfaces comprising a first series of fastening protrusions provided to allow fastening of a positioning cross member, said fastening protrusions being placed in a longitudinal position corresponding to that of said connecting portions.

19. The insulating and supporting device of claim 18 wherein said third lateral surface and said fourth lateral surface respectively comprise a first and a second series of fastening protrusions to allow fastening of said positioning cross member.

20. The insulating and supporting device of claim 14 wherein said second element comprises a third lateral surface and a fourth lateral surface provided with longitudinal grooves defined between connecting portions, said connecting means connecting said first element to said second element so as to allow said grooves defined on one of the lateral surfaces of said first element to combine with said grooves defined on said third or on said fourth lateral surface of said second element to define a series of cavities for insulation and support of busbars, and said seats for housing said connecting means extend on said second element as first through openings from said first lateral surface to said second lateral surface and as second through openings from said third lateral surface to said fourth lateral surface.

* * * * *